United States Patent
Steenhoek et al.

(10) Patent No.: US 11,062,479 B2
(45) Date of Patent: Jul. 13, 2021

(54) SYSTEMS AND METHODS FOR MATCHING COLOR AND APPEARANCE OF TARGET COATINGS

(71) Applicant: AXALTA COATING SYSTEMS IP CO., LLC, Wilmington, DE (US)

(72) Inventors: Larry E. Steenhoek, Wilmington, DE (US); Alessio Tamburro, Philadelphia, PA (US)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 0 days.

(21) Appl. No.: 15/833,597

(22) Filed: Dec. 6, 2017

(65) Prior Publication Data

US 2019/0172228 A1 Jun. 6, 2019

(51) Int. Cl.
*G06T 7/90* (2017.01)
*G06T 7/00* (2017.01)
(Continued)

(52) U.S. Cl.
CPC  *G06T 7/90* (2017.01); *G01J 3/46* (2013.01); *G06F 16/51* (2019.01); *G06F 16/535* (2019.01); *G06K 9/6211* (2013.01); *G06K 9/6232* (2013.01); *G06N 20/00* (2019.01); *G06T 7/001* (2013.01); *G06T 7/33* (2017.01); *H04N 1/6008* (2013.01); *H04N 1/6047* (2013.01); *G06T 2207/10024* (2013.01);
(Continued)

(58) Field of Classification Search
CPC combination set(s) only.
See application file for complete search history.

(56) References Cited

U.S. PATENT DOCUMENTS 5,929,998 A  7/1999  Kettler et al.
6,163,622 A  12/2000  Abdel-Mottaleb et al.
(Continued)

FOREIGN PATENT DOCUMENTS

CN  104504716 A  4/2015
EP  2130013 A1  12/2009
(Continued)

OTHER PUBLICATIONS

Zachary, "An Information Theoretic Approach to Content Based Image Retrieval" (Year: 2000).*

*Primary Examiner* — Zhiyu Lu
(74) *Attorney, Agent, or Firm* — Lorenz & Kopf LLP

(57) ABSTRACT

System and methods for matching color and appearance of a target coating are provided herein. The system includes an electronic imaging device configured to receive a target image data of the target coating. The target image data includes target coating features. The system further includes one or more feature extraction algorithms that extracts the target image features from the target image data. The system further includes a machine-learning model that identifies a calculated match sample image from a plurality of sample images utilizing the target image features. The machine-learning model includes pre-specified matching criteria representing the plurality of sample images for identifying the calculated match sample image from the plurality of sample images. The calculated match sample image is utilized for matching color and appearance of the target coating.

20 Claims, 9 Drawing Sheets

(51) Int. Cl.

| | | |
|---|---|---|
| *H04N 1/60* | (2006.01) | |
| *G06N 20/00* | (2019.01) | |
| *G01J 3/46* | (2006.01) | |
| *G06T 7/33* | (2017.01) | |
| *G06F 16/51* | (2019.01) | |
| *G06F 16/535* | (2019.01) | |
| *G06K 9/62* | (2006.01) | |

(52) U.S. Cl.
CPC ............ *G06T 2207/20081* (2013.01); *G06T 2207/30108* (2013.01); *H04N 1/6052* (2013.01)

(56) References Cited

U.S. PATENT DOCUMENTS

| | | |
|---|---|---|
| 6,362,885 B1 | 3/2002 | Osumi et al. |
| 6,788,413 B2 | 9/2004 | Torfs et al. |
| 6,804,390 B2 | 10/2004 | McClanahan |
| 6,870,614 B2 | 3/2005 | Graf et al. |
| 6,941,287 B1 * | 9/2005 | Vaidyanathan ...... G06K 9/6229 706/12 |
| 6,959,111 B2 | 10/2005 | Hirayama et al. |
| 7,035,464 B2 | 4/2006 | Masuda |
| 7,062,083 B2 | 6/2006 | Lim et al. |
| 7,743,055 B2 | 6/2010 | Rodrigues et al. |
| 7,885,482 B2 | 2/2011 | Kansal |
| 7,991,596 B2 | 8/2011 | Steenhoek |
| 8,065,314 B2 | 11/2011 | Prakash et al. |
| 8,271,242 B2 | 9/2012 | Berlin et al. |
| 8,407,014 B2 | 3/2013 | Prakash et al. |
| 8,629,882 B2 | 1/2014 | Henry |
| 8,885,934 B2 | 11/2014 | Lings et al. |
| 8,909,574 B2 | 12/2014 | Mohammadi et al. |
| 9,390,077 B2 | 7/2016 | Baluja |
| 9,600,908 B2 | 3/2017 | Gordon et al. |
| 9,798,949 B1 * | 10/2017 | Du ............ G06K 9/46 |
| 2004/0073526 A1 | 4/2004 | McClanahan |
| 2006/0210153 A1 * | 9/2006 | Sara ............ G01J 3/46 382/165 |
| 2007/0032965 A1 | 2/2007 | McClanahan et al. |
| 2007/0146713 A1 | 6/2007 | Alman et al. |
| 2009/0019086 A1 * | 1/2009 | Prakash ............ G01J 3/46 |
| 2009/0296152 A1 * | 12/2009 | Mestha ............ H04N 1/6033 358/2.1 |
| 2013/0064426 A1 * | 3/2013 | Watkins, Jr. ......... G06K 9/00261 382/103 |
| 2014/0242271 A1 | 8/2014 | Prakash et al. |
| 2014/0278251 A1 | 9/2014 | Norris |
| 2014/0278253 A1 | 9/2014 | Beymore |
| 2014/0278254 A1 | 9/2014 | Beymore |
| 2015/0026298 A1 | 1/2015 | Kirchner et al. |
| 2015/0110348 A1 * | 4/2015 | Solanki ............ G16H 30/20 382/103 |
| 2015/0134299 A1 | 5/2015 | Norris |
| 2016/0040985 A1 | 2/2016 | Nagai et al. |
| 2016/0187199 A1 * | 6/2016 | Brunk ............ G01J 3/2823 348/89 |
| 2017/0243362 A1 * | 8/2017 | Neisen ............ G06T 7/001 |

FOREIGN PATENT DOCUMENTS

| | | |
|---|---|---|
| JP | 201019732 A | 9/2010 |
| RU | 2489705 C1 | 8/2013 |
| WO | 9731247 A1 | 8/1997 |
| WO | 201472563 A1 | 5/2014 |

* cited by examiner

SYSTEMS AND METHODS FOR MATCHING COLOR AND APPEARANCE OF TARGET COATINGS

TECHNICAL FIELD

The technical field is directed to a system and a method for matching color and appearance of a target coating and more particularly relates to systems and methods for identifying a match sample image having a predefined similarity to a visual data of the target coating.

BACKGROUND

Visualization and selection of coatings having a desired color and appearance plays an important role in many applications. For example, paint suppliers must provide thousands of coatings to cover the range of global OEM manufacturers' coatings for all current and recent model vehicles. Providing this large number of different coatings as factory package products adds complexity to paint manufacture and increases inventory costs. Consequently, paint suppliers provide a mixing machine system including typically 50 to 100 components (e.g., single pigment tints, binders, solvents, additives) with coating formulas for the components that match the range of coatings of vehicles. The mixing machine may reside at a repair facility (i.e., body shop) or a paint distributor and allows a user to obtain the coating having the desired color and appearance by dispensing the components in amounts corresponding to the coating formula. The coating formulas are typically maintained in a database and are distributed to customers via computer software by download or direct connection to internet databases. Each of the coating formulas typically relate to one or more alternate coating formulas to account for variations in coatings due to variations in vehicle production.

Identification of the coating formula most similar to a target coating is complicated by this variation. For example, a particular coating might appear on three vehicle models, produced in two assembly plants with various application equipment, using paint from two OEM paint suppliers, and over a lifetime of five model years. These sources of variation result in significant coating variation over the population of vehicles with that particular coating. The alternate coating formulas provided by the paint supplier are matched to subsets of the color population so that a close match is available for any vehicle that needs repair. Each of the alternate coating formulas can be represented by a color chip in the fan deck which enables the user to select the best matching formula by visual comparison to the vehicle.

Identifying the coating formula most similar to the target coating for a repair is typically accomplished through either the use a spectrophotometer or a fandeck. Spectrophotometers measure one or more color and appearance attributes of the target coating to be repaired. This color and appearance data is then compared with the corresponding data from potential candidate formulas contained in a database. The candidate formula whose color and appearance attributes best match those of the target coating to be repaired is then selected as the coating formula most similar to the target coating. However, spectrophotometers are expensive and not readily available in economy markets.

Alternatively, fandecks include a plurality of sample coating layers on pages or patches within the fandeck. The sample coating layers of the fandeck are then visually compared to the target coating being repaired. The formula associated with the sample coating layer best matching the color and appearance attributes of the target coating to be repaired is then selected as the coating formula most similar to the target coating. However, fandecks are cumbersome to use and difficult to maintain due to the vast number of sample coating layers necessary to account for all coatings on vehicles on the road today.

As such, it is desirable to provide a system and a method for matching color and appearance of a target coating. In addition, other desirable features and characteristics will become apparent from the subsequent summary and detailed description, and the appended claims, taken in conjunction with the accompanying drawings and this background.

SUMMARY

Various non-limiting embodiments of a system for matching color and appearance of a target coating, and various non-limiting embodiments of methods for the same, are disclosed herein.

In one non-limiting embodiment, the system includes, but is not limited to, a storage device for storing instructions for performing the matching of color and appearance of the target coating. The system further includes, but is not limited to, one or more data processors configured to execute the instructions. The one or more data processors are configured to execute the instructions to receive, by the one or more data processors, target image data of the target coating. The target image data is generated by an electronic imaging device and includes target image features. The one or more data processors are configured to execute the instructions to retrieve, by the one or more processors, one or more feature extraction algorithms that extract the target image features from the target image data. The one or more data processors are configured to execute the instructions to apply the target image data to the one or more feature extraction algorithms. The one or more data processors are configured to execute the instructions to extract the target image features from the target image data utilizing the one or more feature extraction algorithms. The one or more data processors are configured to execute the instructions to retrieve, by the one or more data processors, a machine-learning model that identifies a calculated match sample image from a plurality of sample images utilizing the target image features. The machine-learning model includes pre-specified matching criteria representing the plurality of sample images for identifying the calculated match sample image from the plurality of sample images. The one or more data processors are configured to execute the instructions to apply the target image features to the machine-learning model. The one or more data processors are configured to execute the instructions to identify the calculated match sample image based upon substantially satisfying one or more of the pre-specified matching criteria. The calculated match sample image is utilized for matching color and appearance of the target coating.

In another non-limiting embodiment, the method includes, but is not limited to, receiving, by one or more data processors, target image data of the target coating. The target image data is generated by an electronic imaging device and includes target image features. The method further includes, but is not limited to, retrieving, by one or more processors, one or more feature extraction algorithms that extract the target image features from the target image data. The method further includes, but is not limited to, applying the target image data to the one or more feature extraction algorithms. The method further includes, but is not limited to, extracting the target image features from the target image data utilizing the one or more feature extraction algorithms. The method further includes, but is not limited to, retrieving, by one or more data processors, a machine-learning model that identifies a calculated match sample image from a plurality of sample images utilizing the target image features. The machine-learning model includes pre-specified matching criteria representing the plurality of sample images for identifying the calculated match sample image from the plurality of sample images. The method further includes, but is not limited to, applying the target image features to the machine-learning model. The method further includes, but is not limited to, identifying the calculated match sample image based upon substantially satisfying one or more of the pre-specified matching criteria. The calculated match sample image is utilized for matching color and appearance of the target coating.

BRIEF DESCRIPTION OF THE DRAWINGS

Other advantages of the disclosed subject matter will be readily appreciated, as the same becomes better understood by reference to the following detailed description when considered in connection with the accompanying drawings wherein.

DETAILED DESCRIPTION

Figure 1:
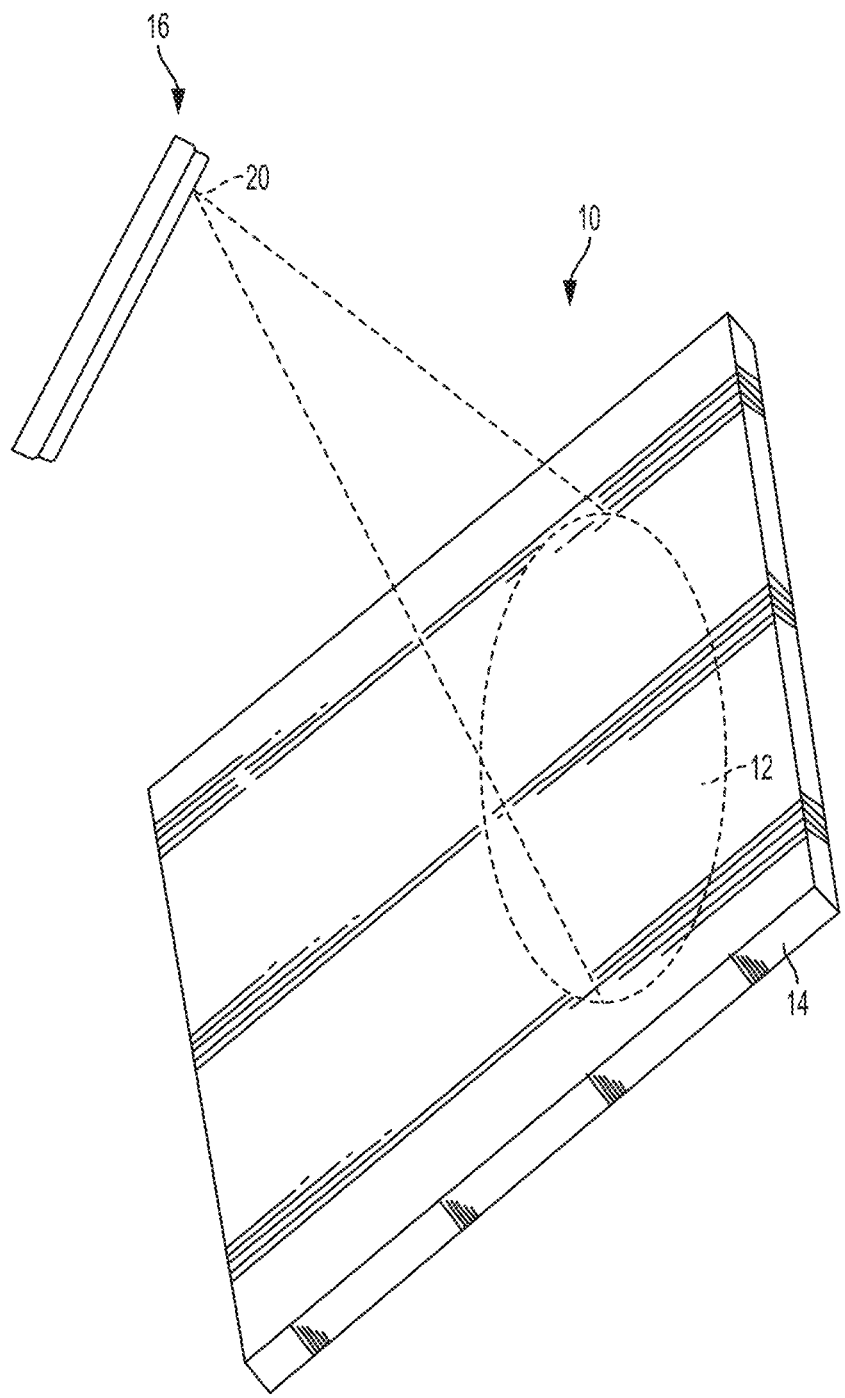
FIG. 1 is a perspective view illustrating a non-limiting embodiment of a system for matching color and appearance of a target coating.

The following detailed description is merely exemplary in nature and is not intended to limit the invention or the application and uses of the invention. Furthermore, there is no intention to be bound by any theory presented in the preceding background or the following detailed description. It should be understood that throughout the drawings, corresponding reference numerals indicate like or corresponding parts and features.

The features and advantages identified in the present disclosure will be more readily understood, by those of ordinary skill in the art, from reading the following detailed description. It is to be appreciated that certain features, which are, for clarity, described above and below in the context of separate embodiments, may also be provided in combination in a single embodiment. Conversely, various features that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this disclosure, unless expressly indicated otherwise, are stated as approximations as though the minimum and maximum values within the stated ranges were both proceeded by the word "about." In this manner, slight variations above and below the stated ranges can be used to achieve substantially the same results as values within the ranges. Also, the disclosure of these ranges is intended as a continuous range including every value between the minimum and maximum values.

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

Techniques and technologies may be described herein in terms of functional and/or logical block components and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to graphics and image processing, touchscreen displays, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

As used herein, the term "module" refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

As used herein, the term "pigment" or "pigments" refers to a colorant or colorants that produce color or colors. A pigment can be from natural or synthetic sources and can be made of organic or inorganic constituents. Pigments can also include metallic particles or flakes with specific or mixed shapes and dimensions. A pigment is usually not soluble in a coating composition.

The term "effect pigment" or "effect pigments" refers to pigments that produce special effects in a coating. Examples of effect pigments include, but not limited to, light scattering pigments, light interference pigments, and light reflecting pigments. Metallic flakes, such as aluminum flakes, and pearlescent pigments, such as mica-based pigments, are examples of effect pigments.

The term "appearance" can include: (1) the aspect of visual experience by which a coating is viewed or recognized; and (2) perception in which the spectral and geometric aspects of a coating is integrated with its illuminating and viewing environment. In general, appearance includes texture, coarseness, sparkle, or other visual effects of a coating, especially when viewed from varying viewing angles and/or with varying illumination conditions. Appearance characteristics or appearance data can include, but not limited to, descriptions or measurement data on texture, metallic effect, pearlescent effect, gloss, distinctness of image, flake appearances and sizes such as texture, coarseness, sparkle, glint and glitter as well as the enhancement of depth perception in the coatings imparted by the flakes, especially produced by metallic flakes, such as aluminum flakes. Appearance characteristics can be obtained by visual inspection or by using an appearance measurement device.

The term "color data" or "color characteristics" of a coating can comprise measured color data including spectral reflectance values, X,Y,Z values, L,a,b values, L*,a*,b* values, L,C,h values, or a combination thereof. Color data can further comprise a color code of a vehicle, a color name or description, or a combination thereof. Color data can even further comprise visual aspects of color of the coating, chroma, hue, lightness or darkness. The color data can be obtained by visual inspection, or by using a color measurement device such as a colorimeter, a spectrophotometer, or a goniospectrophotometer. In particular, spectrophotometers obtain color data by determining the wavelength of light reflected by a coating layer. The color data can also comprise descriptive data, such as a name of a color, a color code of a vehicle; a binary, textural or encrypted data file containing descriptive data for one or more colors; a measurement data file, such as those generated by a color measuring device; or an export/import data file generated by a computing device or a color measuring device. Color data can also be generated by an appearance measuring device or a color-appearance dual measuring device.

The term "coating" or "coating composition" can include any coating compositions known to those skilled in the art and can include a two-pack coating composition, also known as "2K coating composition"; a one-pack or 1K coating composition; a coating composition having a crosslinkable component and a crosslinking component; a radiation curable coating composition, such as a UV curable coating composition or an E-beam curable coating composition; a mono-cure coating composition; a dual-cure coating composition; a lacquer coating composition; a waterborne coating composition or aqueous coating composition; a solvent borne coating composition; or any other coating compositions known to those skilled in the art. The coating composition can be formulated as a primer, a basecoat, or a color coat composition by incorporating desired pigments or effect pigments. The coating composition can also be formulated as a clearcoat composition.

The term "vehicle", "automotive", "automobile" or "automotive vehicle" can include an automobile, such as car, bus, truck, semi truck, pickup truck, SUV (Sports Utility Vehicle); tractor; motorcycle; trailer; ATV (all terrain vehicle); heavy duty mover, such as, bulldozer, mobile crane and earth mover; airplanes; boats; ships; and other modes of transport.

The term "formula," "matching formula," or "matching formulation" for a coating composition refers to a collection of information or instruction, based upon that, the coating composition can be prepared. In one example, a matching formula includes a list of names and quantities of pigments, effect pigments, and other components of a coating composition. In another example, a matching formula includes instructions on how to mix multiple components of a coating composition.

A processor-implemented system 10 for matching color and appearance of a target coating 12 is provided herein with reference to FIG. 1. The target coating 12 may be on a substrate 14. The substrate 14 may be a vehicle or parts of a vehicle. The substrate 14 may also be any coated article including the target coating 12. The target coating 12 may include a color coat layer, a clearcoat layer, or a combination of a color coat layer and a clearcoat layer. The color coat layer may be formed from a color coat composition. The clearcoat layer may be formed from a clearcoat coating composition. The target coating 12 may be formed from one or more solvent borne coating compositions, one or more waterborne coating compositions, one or more two-pack coating compositions or one or more one-pack coating compositions. The target coating 12 may also be formed from one or more coating compositions each having a crosslinkable component and a crosslinking component, one or more radiation curable coating compositions, or one or more lacquer coating compositions.

Figure 2:
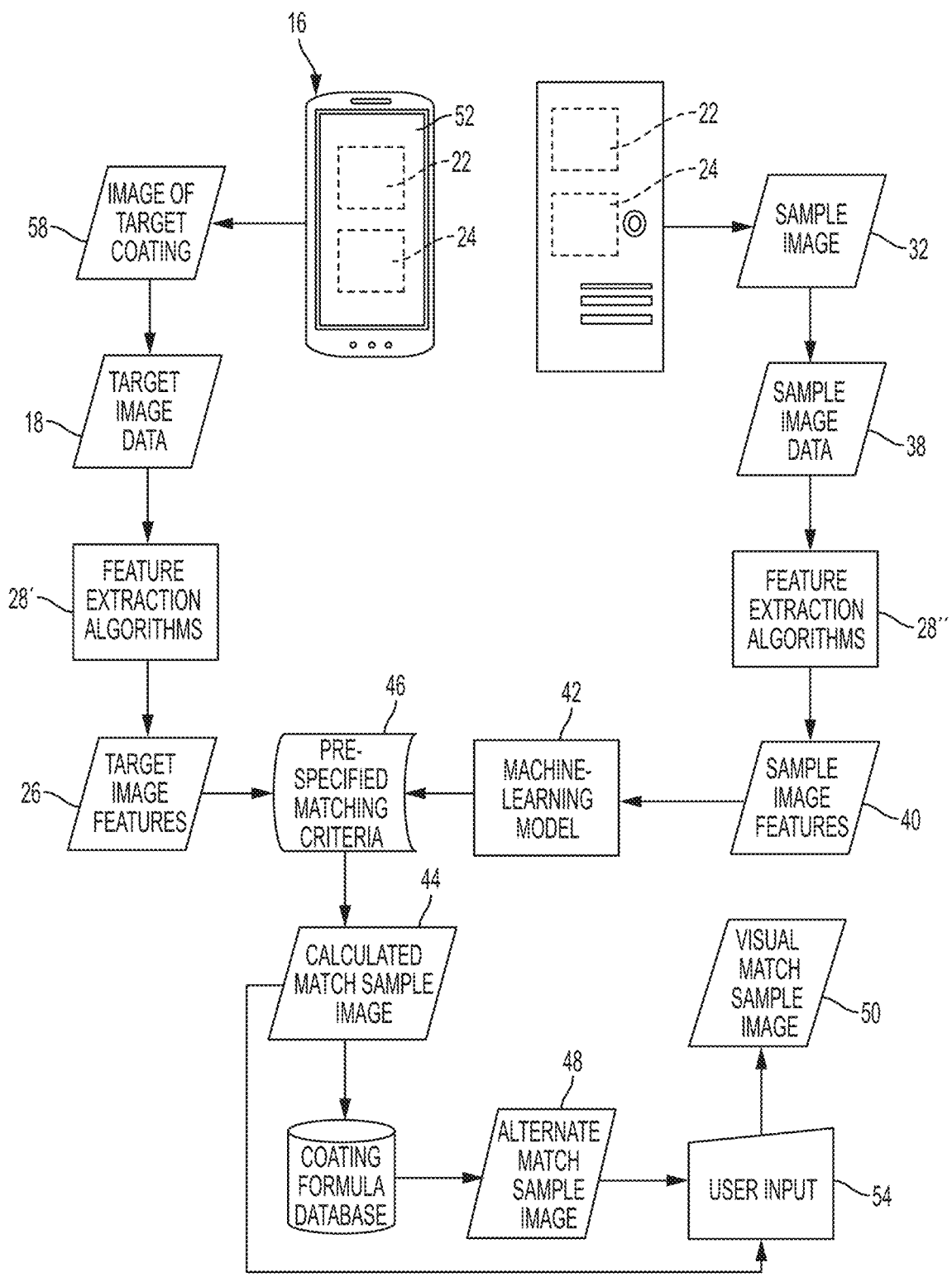
FIG. 2 is a block diagram illustrating a non-limiting embodiment of the system of FIG. 1.

With reference to FIG. 2 and continued reference to FIG. 1, the system 10 includes an electronic imaging device 16 configured to generate target image data 18 of the target coating 12. The electronic imaging device 16 may be a device that can capture images under a wide range of electromagnetic wavelengths including visible or invisible wavelengths. The electronic imaging device 16 may be further defined as a mobile device. Examples of mobile devices include, but are not limited to, a mobile phone (e.g., a smartphone), a mobile computer (e.g., a tablet or a laptop), a wearable device (e.g., smart watch or headset), or any other type of device known in the art configured to receive the target image data 18. In an exemplary embodiment, the mobile device is a smartphone or a tablet.

Figure 7:
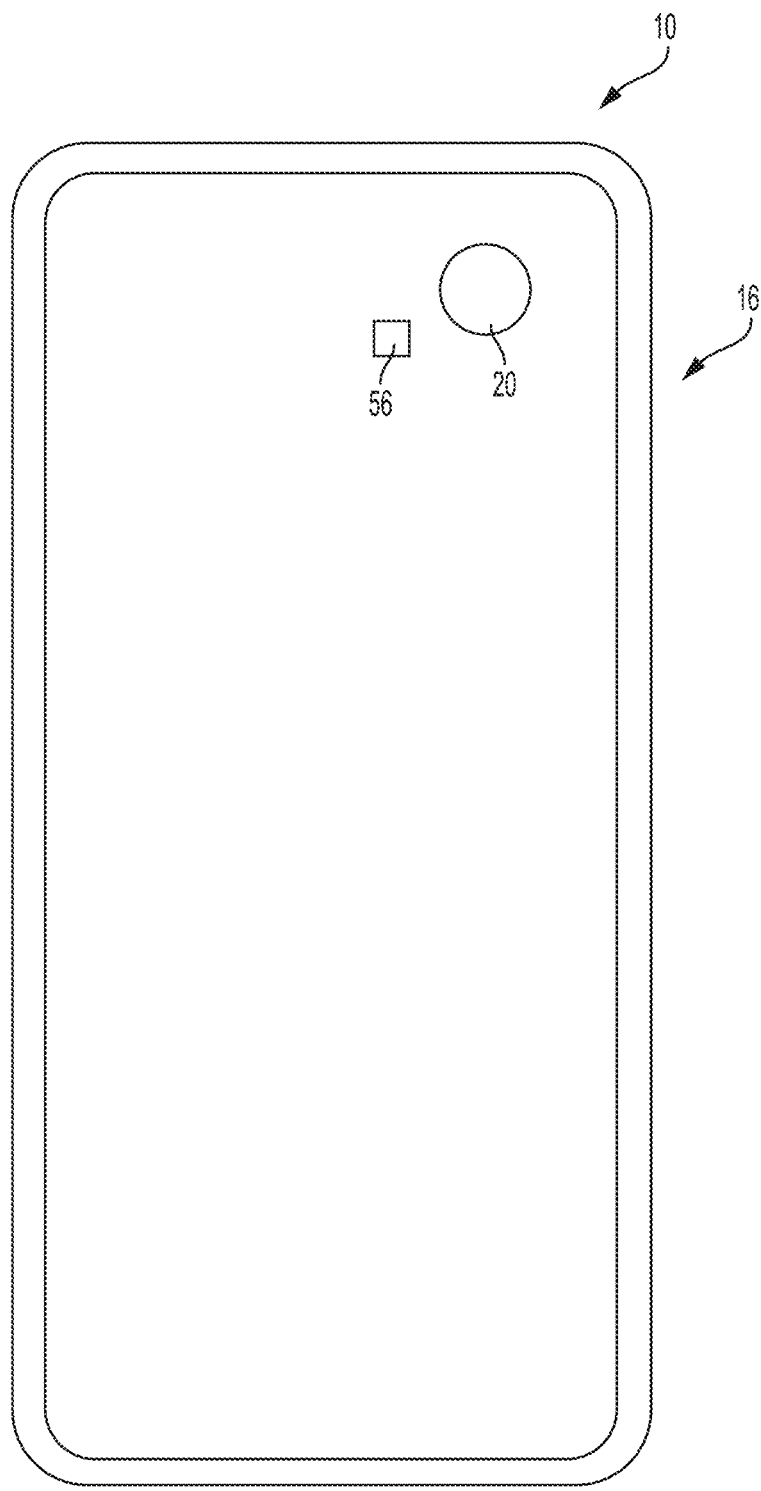
FIG. 7 is another perspective view illustrating a non-limiting embodiment of an electronic imaging device of the system of FIG. 1.

In embodiments, the electronic imaging device 16 includes a camera 20 (see FIG. 7). The camera 20 may be configured to obtain the target image data 18. The camera 20 may be configured to capture images having visible wavelengths. The target image data 18 may be derived from an image 58 of the target coating 12, such as a still image or a video. In certain embodiments, the target image data 18 is derived from a still image. In the exemplary embodiment shown in FIG. 1, the electronic imaging device 16 is shown disposed in the proximity of and spaced from the target coating 12. However, it should be appreciated that the electronic imaging device 16 of the exemplary embodiment is portable, such that it may be moved to another coating (not shown). In other embodiments (not shown), the electronic imaging device 16 may be fixed at a location. In yet other embodiments (not shown), the electronic imaging device 16 may be attached to a robotic arm to be moved automatically. In further embodiments (not shown), the electronic imaging device 16 may be configured to measure characteristics of multiple surfaces simultaneously.

The system 10 further includes a storage device 22 for storing instructions for performing the matching of color and appearance of the target coating 12. The storage device 22 may store instructions that can be performed by one or more data processors 24. The instructions stored in the storage device 22 may include one or more separate programs, each of which includes an ordered listing of executable instructions for implementing logical functions. When the system 10 is in operation, the one or more data processors 24 are configured to execute the instructions stored within the storage device 22, to communicate data to and from the storage device 22, and to generally control operations of the system 10 pursuant to the instructions. In certain embodiments, the storage device 22 is associated with (or alternatively included within) the electronic imaging device 16, a server associated with the system 10, a cloud-computing environment associated with the system 10, or combinations thereof.

As introduced above, the system 10 further includes the one or more data processors 24 configured to execute the instructions. The one or more data processors 24 are configured to be communicatively coupled with the electronic imaging device 16. The one or more data processors 24 can be any custom made or commercially available processor, a central processing unit (CPU), an auxiliary processor among several processors associated with the electronic imaging device 16, a semiconductor based microprocessor (in the form of a microchip or chip set), or generally any device for executing instructions. The one or more data processors 24 may be communicatively coupled with any component of the system 10 through wired connections, wireless connections and/or devices, or a combination thereof. Examples of suitable wired connections includes, but are not limited to, hardware couplings, splitters, connectors, cables or wires. Examples of suitable wireless connections and devices include, but not limited to, Wi-Fi device, Bluetooth device, wide area network (WAN) wireless device, Wi-Max device, local area network (LAN) device, 3G broadband device, infrared communication device, optical data transfer device, radio transmitter and optionally receiver, wireless phone, wireless phone adaptor card, or any other devices that can transmit signals in a wide range of electromagnetic wavelengths including radio frequency, microwave frequency, visible or invisible wavelengths.

Figure 3A:
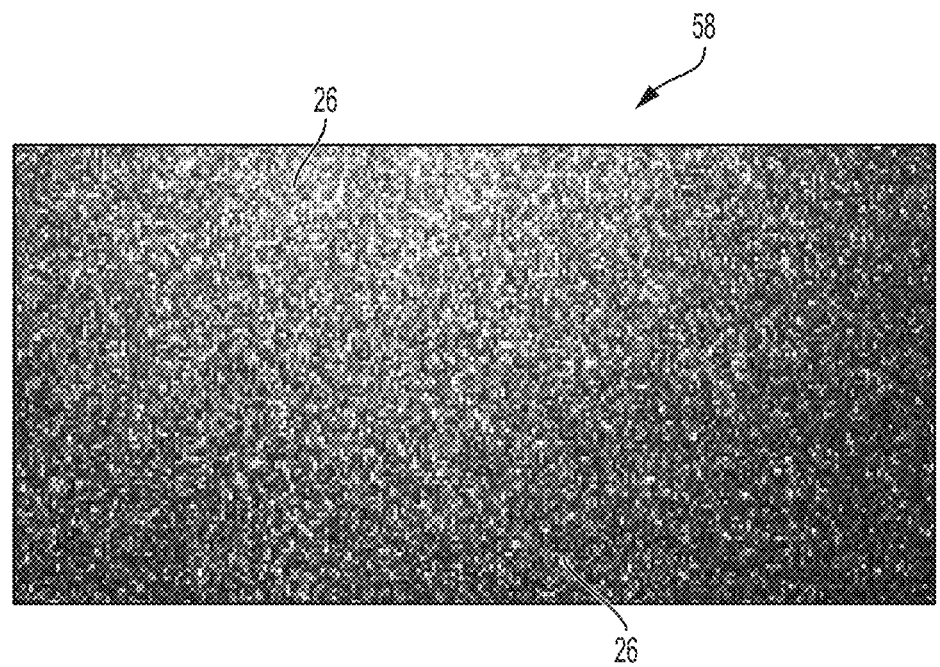
FIG. 3A is an image illustrating a non-limiting embodiment of the target coating of FIG. 1.
Figure 3B:
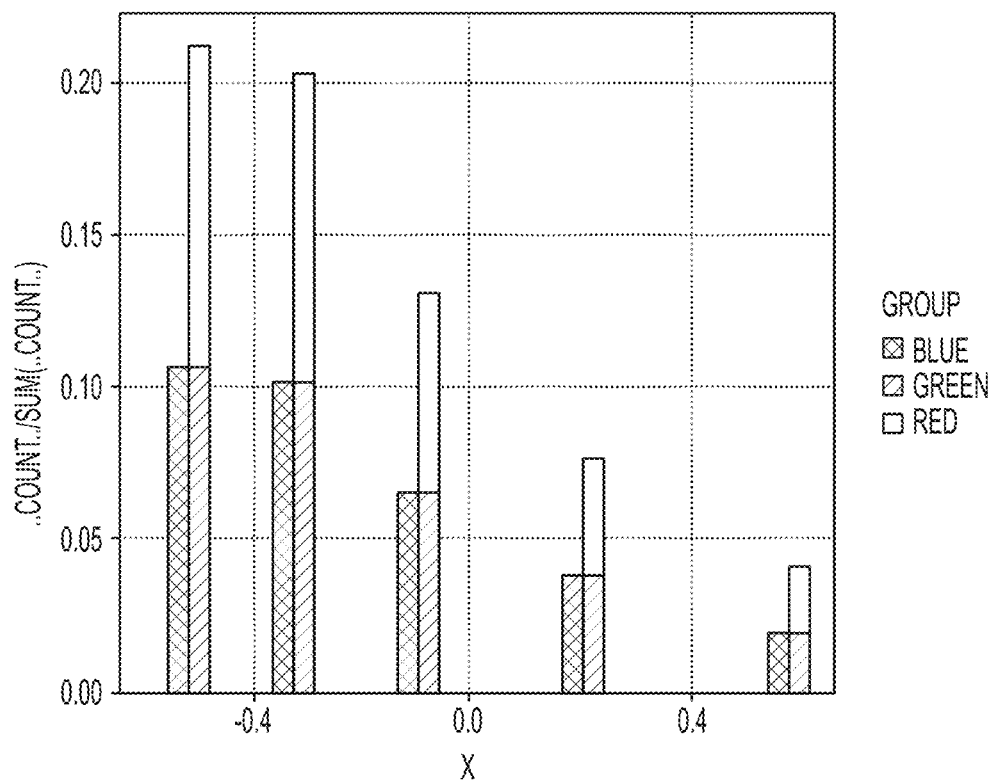
FIG. 3B is a graphical representation of RGB values illustrating a non-limiting embodiment of the target coating of FIG. 2A.

With reference to FIGS. 3A and 3B, the one or more data processors 24 are configured to execute the instructions to receive, by the one or more data processors 24, target image data 18 of the target coating 12. As described above, the target image data 18 is generated by the electronic imaging device 16. The target image data 18 may define RGB values, L*a*b* values, or a combination thereof, representative of the target coating 12. In certain embodiments, the target image data 18 defines the RGB values representative of the target coating 12. The one or more data processors 24 may be further configured to execute the instructions to transform the RGB values of the target image data 18 to L*a*b* values representative of the target coating 12.

The target image data 18 includes target image features 26. The target image features 26 may include color and appearance characteristics of the target coating 12, representations of the target image data 18, or a combination thereof. In certain embodiments, the target image features 26 may include representations based on image entropy.

The one or more data processors 24 are configured to execute the instructions to retrieve, by the one or more data processors 24, one or more feature extraction algorithms 28' that extract the target image features 26 from the target image data 18. In embodiments, the one or more feature extraction algorithms 28' are configured to identify the representation based on image entropy for extracting the target image features 26 from the target image data 18. To this end, the one or more data processors 24 may be configured to execute the instructions to identify the representation based on image entropy for extracting the target image features 26 from the target image data 18.

Identifying the representation based on image entropy may include determining color image entropy curves for the target image data 18. The target image data 18 may be represented in a three-dimensional L*a*b* space with the color entropy curves based on Shannon entropy of each of the a*b* planes, of each of the L*a* planes, of each of the L*b* planes, or combinations thereof. The determination of the color entropy curves may include dividing the three-dimensional L*a*b* space of the target image data 18 into a plurality of cubic subspaces, tabulating the cubic spaces having similar characteristics to arrive at a total cubic space count for each characteristic, generating empty image entropy arrays for each of the dimensions of the three-dimensional L*a*b* space, and populating the empty image entropy arrays with the total cubic space counts corresponding to each of the dimensions.

Identifying the representation based on image entropy may also include determining color difference image entropy curves for the target image data 18. The target image data 18 may be represented in a three-dimensional L*a*b* space with the three-dimensional L*a*b* space analyzed in relation to an alternative three-dimensional L*a*b* space. The determination of the color difference entropy curves may include calculating dL* image entropy, dC* image entropy, and dh* image entropy between the three-dimensional L*a*b* space and the alternative three-dimensional L*a*b* space.

Identifying the representation based on image entropy may also include determining black and white intensity image entropy from the L* plane of the three-dimensional L*a*b* space of the target image data 18. Identifying the representation based on image entropy may also include determining average L*a*b* values of the target image data 18. Identifying the representation based on image entropy may also include determining L*a*b* values for the center of the most populated cubic subspace.

The one or more data processors 24 are also configured to execute the instructions described above to apply the target image data 18 to the one or more feature extraction algorithms 28'. The one or more data processors 24 are further configured to execute the instructions described above to extract the target image features 26 from the target image data 18 utilizing the one or more feature extraction algorithms 28'.

In an exemplary embodiment, the system 10 is configured to extract the target image features 26 from the target image data 18 by identifying the representation based on image entropy of the target image features 26. Identifying the representation based on image entropy may include determining color image entropy curves for the target image data 18, determining color image entropy curves for the target image data 18, determining black and white intensity image entropy from the L* plane of the three-dimensional L*a*b* space of the target image data 18, determining average L*a*b* values of the target image data 18, determining L*a*b* values for the center of the most populated cubic subspace, or combinations thereof.

Figure 4A:
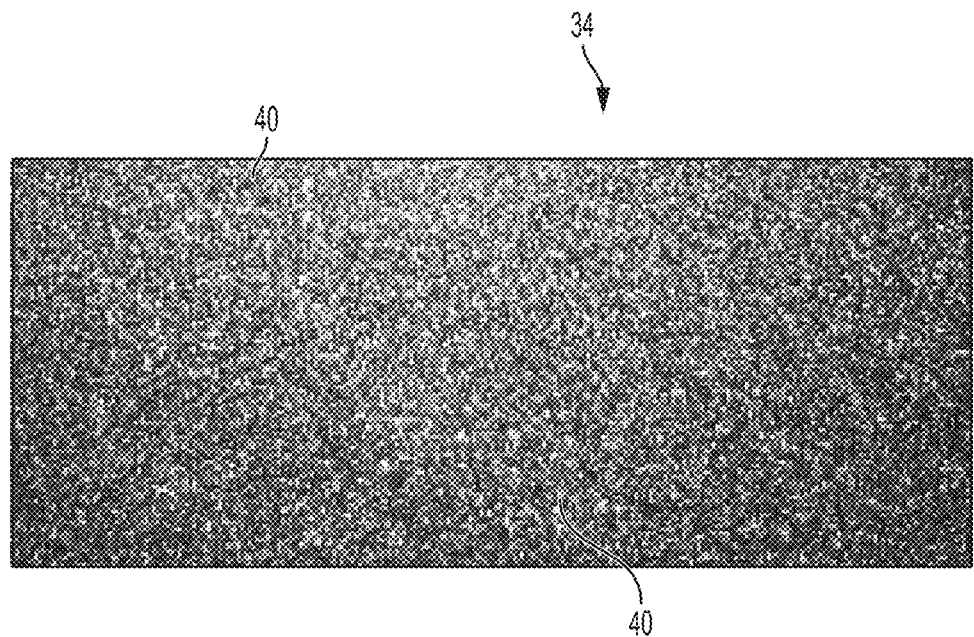
FIG. 4A is an image illustrating a non-limiting embodiment of a first sample image of the system of FIG. 1.
Figure 5A:
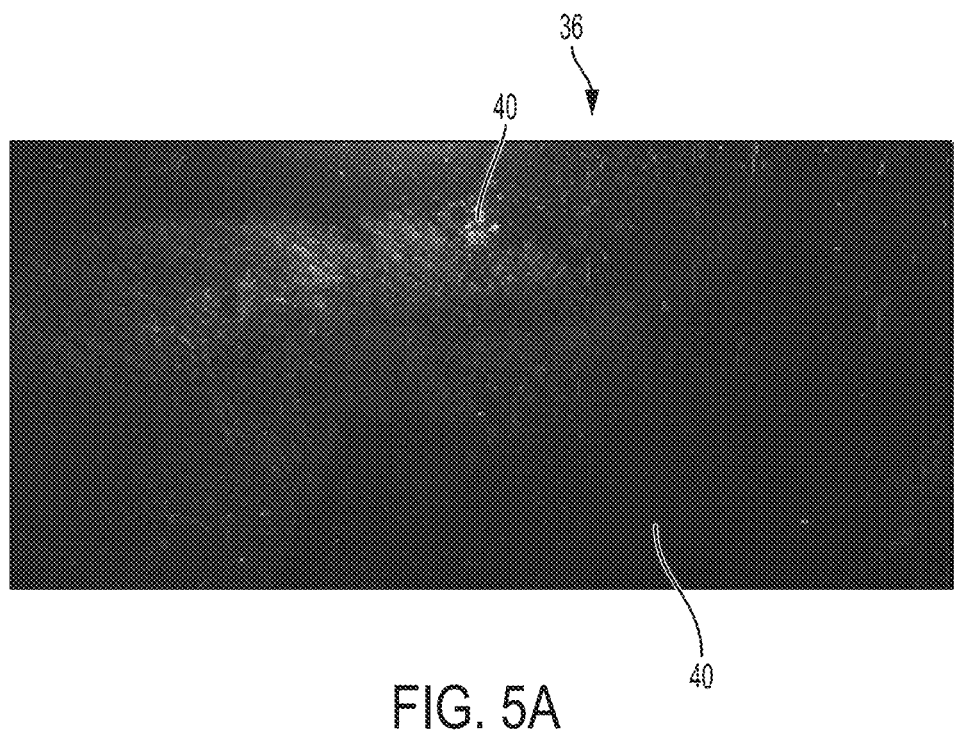
FIG. 5A is an image illustrating a non-limiting embodiment of a second sample image of the system of FIG. 1.

With reference to FIG. 4A and 5A and continuing to reference to FIG. 2, in embodiments, the system 10 further includes an image database 30. The image database 30 may be associated with the electronic imaging device 16 or separate from the electronic imaging device 16, such as in a server-based or in a cloud computing environment. It is to be appreciated that the one or more data processors 24 are configured to be communicatively coupled with the image database 30. The image database 30 may include a plurality of sample images 32, such as a first sample image 34 as shown in FIG. 4A and a second sample image 36 as shown in FIG. 5A. In embodiments, each of the plurality of sample images 32 is an image of a panel including a sample coating. A variety of sample coatings, defining a set of coating formulas, may be imaged to generate the plurality of sample images 32. The sample images 32 may be imaged utilizing one or more different electronic imaging devices 16 to account for variations in imaging abilities and performance of each of the electronic imaging devices 16. The plurality of sample images 32 may be in any format, such as RAW, JPEG, TIFF, BMP, GIF, PNG, and the like.

Figure 4B:
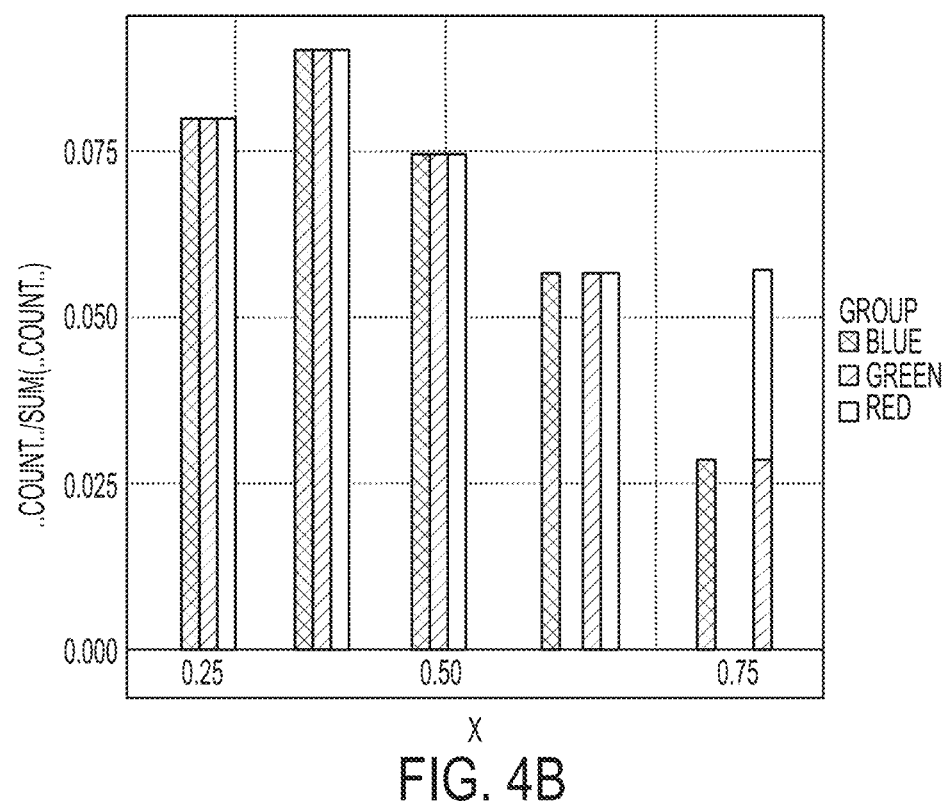
FIG. 4B is a graphical representation of RGB values illustrating a non-limiting embodiment of the first sample image of FIG. 4A.
Figure 5B:
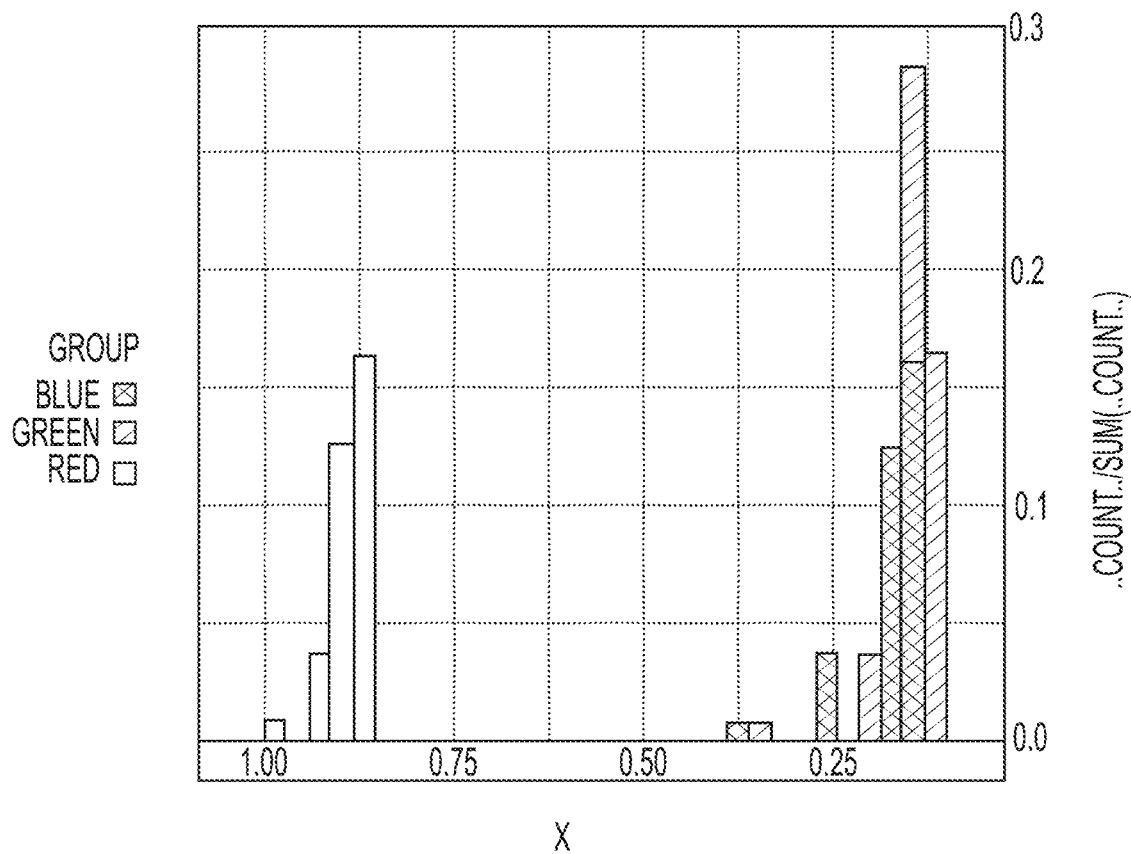
FIG. 5B is a graphical representation of RGB values illustrating a non-limiting embodiment of the second sample image of FIG. 5A.

The one or more data processors 24 may be configured to execute the instructions to receive, by the one or more data processors 24, sample image data 38 of the sample images 32. The sample image data 38 may be generated by the electronic imaging device 16. The sample image data 38 may define RGB values, L*a*b* values, or a combination thereof, representative of the sample images 32. In certain embodiments, the sample image data 38 defines the RGB values representative of the sample images 32, such as shown in FIG. 4B for the first sample image 34 and FIG. 5B for the second sample image 36. The one or more data processors 24 may be further configured to execute the instructions to transform the RGB values of the sample image data 38 to L*a*b* values representative of the sample images 32. The system 10 may be configured to normalize the sample image data 38 of the plurality of sample images 32 for various electronic imaging devices 16 thereby improving performance of the system 10.

The sample image data 38 may include sample image features 40. The sample image features 40 may include color and appearance characteristics of the sample image 32, representations of the sample image data 38, or a combination thereof. In certain embodiments, the sample image features 40 may include representations based on image entropy.

The one or more data processors 24 are configured to execute the instructions to retrieve, by the one or more data processors 24, one or more feature extraction algorithms 28" that extract the sample image features 40 from the sample image data 38. In embodiments, the one or more feature extraction algorithms 28" are configured to identify the representation based on image entropy for extracting the sample image features 40 from the sample image data 38. To this end, the one or more data processors 24 may be configured to execute the instructions to identify the representation based on image entropy for extracting the sample image features 40 from the sample image data 38. It is to be appreciated that the one or more feature extraction algorithms 28" utilized to extract the sample image features 40 may be the same as or different than the one or more feature extraction algorithms 28' utilized to extract the target image features 26.

In an exemplary embodiment, the system 10 is configured to extract the sample image features 40 from the sample image data 38 by identifying the representation based on image entropy of the sample image features 40. Identifying the representation based on image entropy may include determining color image entropy curves for the sample image data 38, determining color image entropy curves for the sample image data 38, determining black and white intensity image entropy from the L* plane of the three-dimensional L*a*b* space of the sample image data 38, determining average L*a*b* values of the sample image data 38, determining L*a*b* values for the center of the most populated cubic subspace, or combinations thereof.

The one or more data processors 24 are configured to execute the instructions to retrieve, by one or more data processors, a machine-learning model 42 that identifies a calculated match sample image 44 from the plurality of sample images 32 utilizing the target image features 26. The machine-learning model 42 may utilize supervised training, unsupervised training, or a combination thereof. In an exemplary embodiment, the machine-learning model 42 utilizes supervised training. Examples of suitable machine-learning models include, but are not limited to, linear regression, decision tree, k-means clustering, principal component analysis (PCA), random decision forest, neural network, or any other type of machine learning algorithm known in the art. In an exemplary embodiment, the machine-learning model is based on a random decision forest algorithm.

The machine-learning model 42 includes pre-specified matching criteria 46 representing the plurality of sample images 32 for identifying the calculated match sample image 44 from the plurality of sample images 32. In embodiments, the pre-specified matching criteria 46 are arranged in one or more decision trees. The one or more data processors 24 are configured to apply the target image features 26 to the machine-learning model 42. In an exemplary embodiment, the pre-specified matching criteria 46 are included in one or more decision trees with the decisions trees including root nodes, intermediate nodes through various levels, and end nodes. The target image features 26 may be processed through the nodes to one or more of the end nodes with each of the end nodes representing one of the plurality of sample images 32.

The one or more data processors 24 are also configured to identify the calculated match sample image 44 based upon substantially satisfying one or more of the pre-specified matching criteria 46. In embodiments, the phase "substantially satisfying" means that the calculated match sample image 44 is identified from the plurality of sample images 32 by having the greatest probability for matching the target coating 12. In an exemplary embodiment, the machine-learning model 42 is based on a random decision forest algorithm including a plurality of decision trees with outcomes of each of the decisions trees, through processing of the target image features 26, being utilized to determine a probably of each of the sample images 32 matching the target coating 12. The sample image 32 having the greatest probability for matching the target coating 12 may be defined as the calculated match sample image 44.

In embodiments, the one or more data processors 24 are configured to execute the instructions to generate the pre-specified matching criteria 46 of the machine-learning model 42 based on the sample image features 40. In certain embodiments, the pre-specified matching criteria 46 are generated based on the sample image features 40 extracted from the plurality of sample images 32. The one or more data processors 24 may be configured to execute the instructions to train the machine-learning model 42 based on the plurality of sample images 32 by generating the pre-specified matching criteria 46 based on the sample image features 40. The machine-learning model 42 may be trained at regular intervals (e.g., monthly) based on the plurality of sample images 32 included within the image database 30. As described above, the sample image data 38 defining the RGB values representative of the sample images 32 may be transformed to L*a*b* values with the sample image features 40 extracted from the sample image data 38 including L*a*b* values by identifying the representations based on image entropy.

The calculated match sample image 44 is utilized for matching color and appearance of the target coating 12. The calculated match sample image 44 may correspond to a coating formula potentially matching color and appearance of the target coating 12. The system 10 may include one or more alternate match sample images 48 related to the calculated match sample image 44. The one or more alternate match sample images 48 may relate to the calculated match sample image 44 based on coating formula, observed similarity, calculated similarity, or combinations thereof. In certain embodiments, the one or more alternate match sample images 48 are related to the calculated match sample image 44 based on the coating formula. In embodiments, the calculated match sample image 44 corresponds to a primary coating formula and the one or more alternate match sample images 48 correspond to alternate coating formulas related to the primary coating formula. The system 10 may include a visual match sample image 50, selectable by a user, from the calculated match sample image 44 and the one or more alternate match sample images 48 based on an observed similarity to the target coating 12 by the user.

Figure 6:
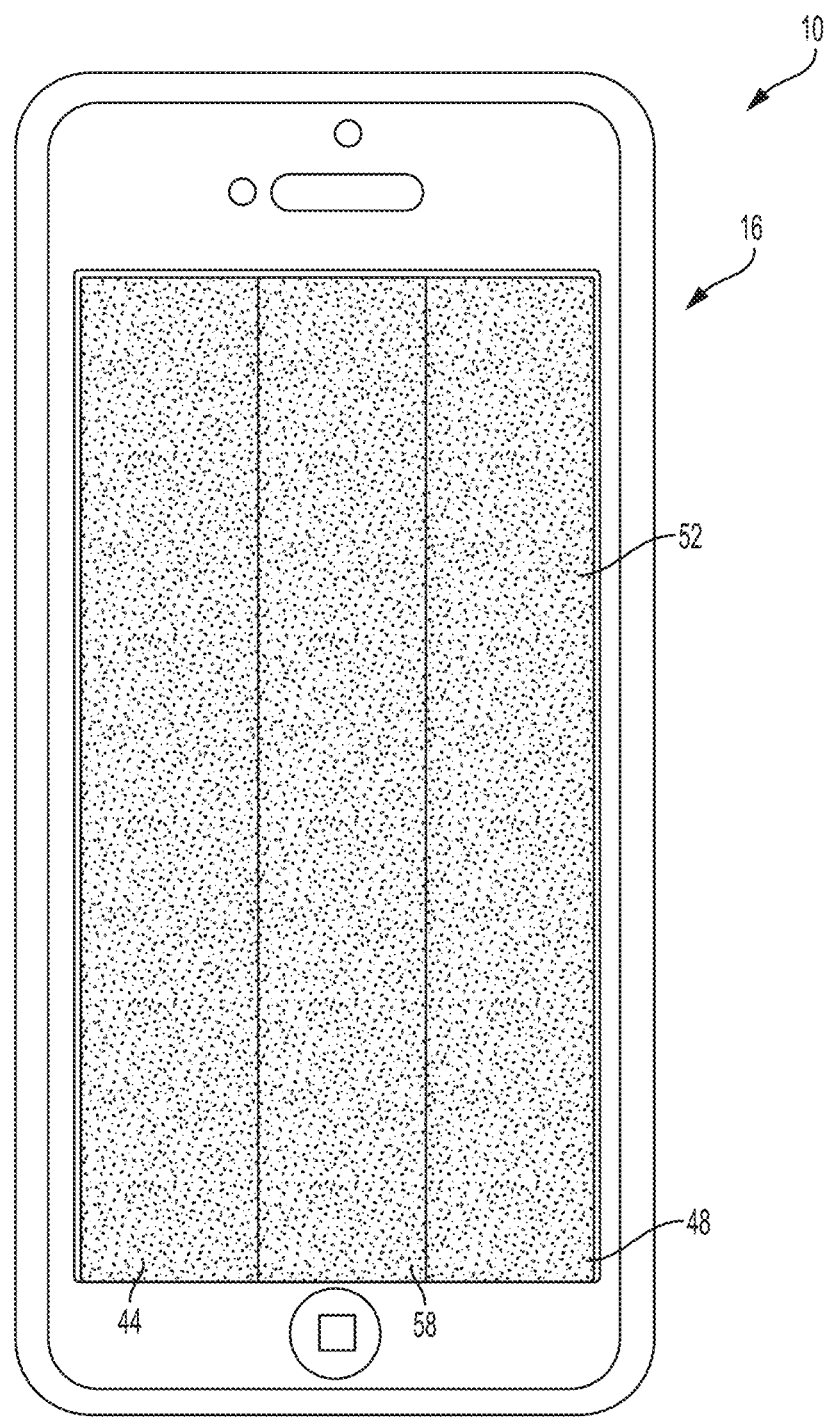
FIG. 6 is a perspective view illustrating a non-limiting embodiment of an electronic imaging device of the system of FIG. 1.

With reference to FIGS. 6 and 7, in embodiments, the electronic imaging device 16 further includes a display 52 configured to display the calculated match sample image 44. In certain embodiments, the display 52 is further configured to display an image 58 of the target coating 12 adjacent the calculated match sample image 44. In an exemplary embodiment, the display 52 is further configured to display the one or more alternate match sample images 48 related to the calculated match sample image 44. In embodiments of the electronic imaging device 16 including the camera 20, the display 52 may be located opposite of the camera 20.

In embodiments, the system 10 further includes a user input module 54 configured to select, by a user, the visual match sample image 50 from the calculated match sample image 44 and the one or more alternate match sample images 48 based on an observed similarity to the target coating 12 by the user. In embodiments of the electronic imaging device 16 including the display 52, the user may select the visual match sample image 50 by touch input on the display 52.

In embodiments, the system 10 further includes a light source 56 configured to illuminate the target coating 12. In embodiments of the electronic imaging device 16 including the camera 20, the electronic imaging device 16 may include the light source 56 and the light source 56 may be located adjacent the camera 20.

In embodiments, the system 10 further includes a dark box (not shown) for isolating the target coating 12 to be imaged from extraneous light, shadows, and reflections. The dark box may be configured to receive the electronic imaging device 16 and permit exposure of target coating 12 to the camera 20 and the light source 56. The dark box may include a light diffuser (not shown) configured to cooperate with the light source 56 for sufficiently diffusing the light generated from the light source 56.

Figure 8:
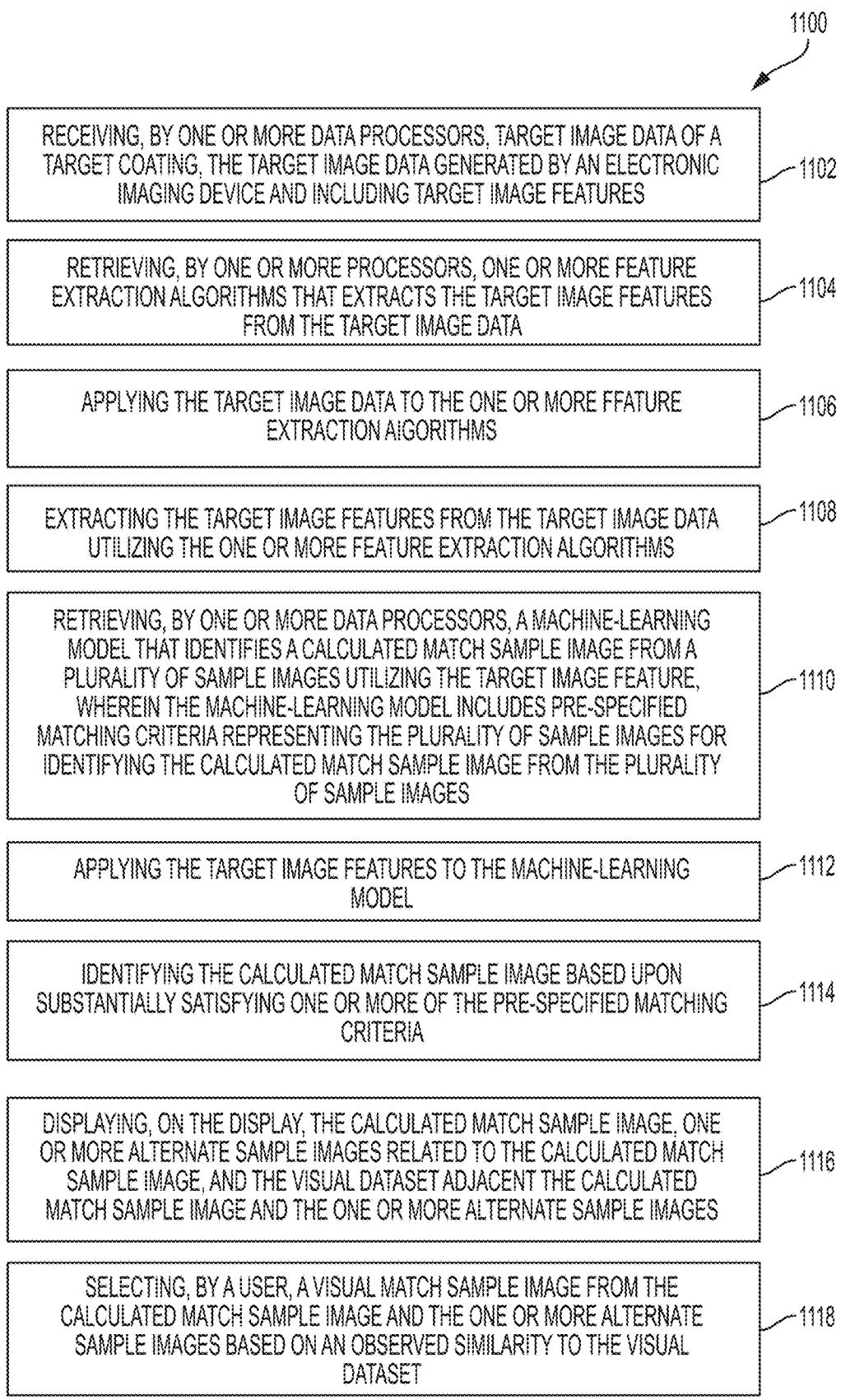
FIG. 8 is a flow chart illustrating a non-limiting embodiment of the system of FIG. 1.

A method 1100 for matching color and appearance of the target coating 12 is also provided herein with reference to FIG. 8 and continuing reference to FIGS. 1-7. The method 1100 includes the step 1102 of receiving, by one or more data processors, the target image data 18 of the target coating 12. The target image data 18 is generated by the electronic imaging device 16 and includes the target image features 26. The method 1100 further includes the step 1104 of retrieving, by one or more processors, one or more feature extraction algorithms 28' that extracts the target image features 26 from the target image data 18. The method 1100 further includes the step 1106 of applying the target image features 26 to the one or more feature extraction algorithms 28'. The method 1100 further includes the step 1108 of extracting the target image features 26 from the target image data 18 utilizing the one or more feature extraction algorithms 28'.

The method 1100 further includes the step 1110 of retrieving, by one or more data processors, the machine-learning model 42 that identifies the calculated match sample image 44 from the plurality of sample images 32 utilizing the target image features 26. The machine-learning model 42 includes the pre-specified matching criteria 46 representing the plurality of sample images 32 for identifying the calculated match sample image 44 from the plurality of sample image 32. The method 1100 further includes the step 1112 of applying the target image features 26 to the machine-learning model 42. The method 1100 further includes the step 1114 of identifying the calculated match sample image 44 based upon substantially satisfying one or more of the pre-specified matching criteria 46.

In embodiments, the method 1100 further includes the step 1116 of displaying, on the display 52, the calculated match sample image 44, the one or more alternate match sample images 48 related to the calculated match sample image 44, and an image 58 of the target coating 12 adjacent the calculated match sample image 44 and the one or more alternate match sample images 48. In embodiments, the method 1100 further includes the step 1118 of selecting, by the user, the visual match sample image 50 from the calculated match sample image 44 and the one or more alternate match sample images 48 based on the observed similarity to the target image data 18.

Figure 9:
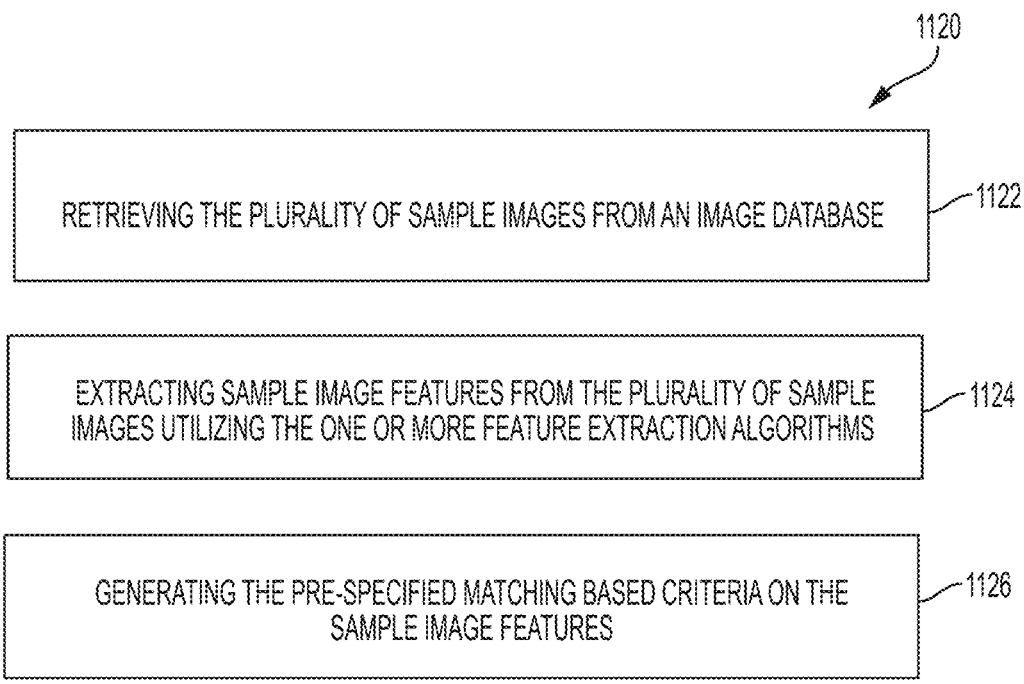
FIG. 9 is a flow chart illustrating a non-limiting embodiment of the method of FIG. 8.

With reference to FIG. 9 and continuing reference to FIGS. 1-8, in embodiments, the method 1100 further includes the step 1120 of generating the machine-learning model 42 based on the plurality of sample images 32. The step 1120 of generating the machine-learning model 42 may include the step 1122 of retrieving the plurality of sample images 32 from the image database 30. The step 1120 of generating the machine-learning model 42 may further include the step 1124 of extracting the sample image features 40 from the plurality of sample images 32 based on one or more feature extraction algorithms 28'. The step 1120 of generating the machine-learning model 42 may further include the step 1126 of generating the pre-specified matching criteria 46 based on the sample image features 40.

Figure 10:
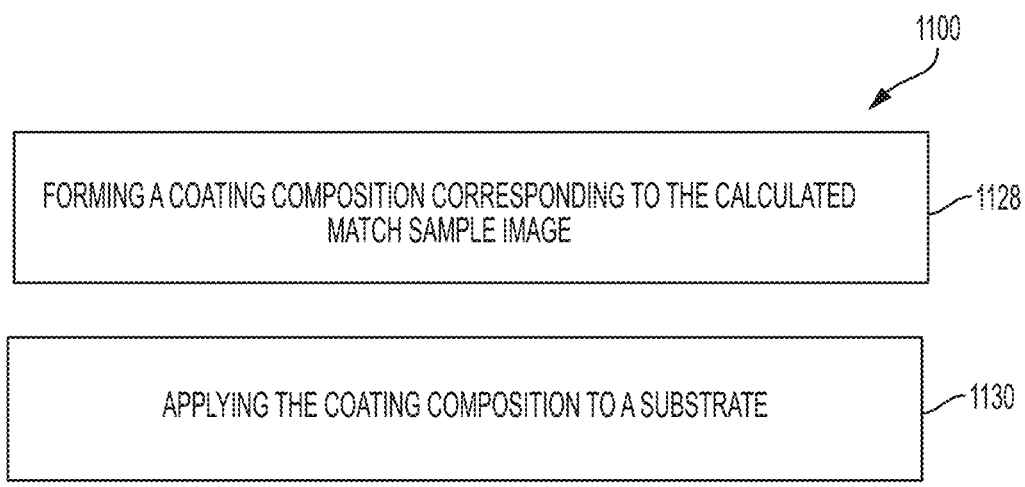
FIG. 10 is a flow chart illustrating another non-limiting embodiment of the method of FIG. 8.

With reference to FIG. 10 and continuing reference to FIGS. 1-9, in embodiments, the method 1100 further includes the step 1128 of forming a coating composition corresponding to the calculated match sample image 44. The method 1100 may further include the step 1130 of applying the coating composition to the substrate 14.

The method 1100 and the system 10 disclosed herein can be used for any coated article or substrate 14, including the target coating 12. Some examples of such coated articles can include, but not limited to, home appliances, such as refrigerator, washing machine, dishwasher, microwave ovens, cooking and baking ovens; electronic appliances, such as television sets, computers, electronic game sets, audio and video equipment; recreational equipment, such as bicycles, ski equipment, all-terrain vehicles; and home or office furniture, such as tables, file cabinets; water vessels or crafts, such as boats, yachts, or personal watercrafts (PWCs); aircrafts; buildings; structures, such as bridges; industrial equipment, such as cranes, heavy duty trucks, or earth movers; or ornamental articles.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A processor-implemented system for matching color and appearance of a target coating, the system comprising:
a storage device for storing instructions for performing the matching of color and appearance of the target coating; and
one or more data processors configured to execute the instructions to:
receive, by one or more data processors, target image data of the target coating, the target image data generated by an electronic imaging device and including target image features;
retrieve, by one or more processors, one or more feature extraction algorithms that extract the target image features from the target image data;
apply the target image data to the one or more feature extraction algorithms;
extract the target image features comprising representations based on image entropy analysis of multiple subportions within the target image data from the target image data utilizing the one or more feature extraction algorithms;
retrieve, by one or more data processors, a machine-learning model that is trained based on sample image features extracted from a plurality of sample images to provide pre-specified matching criteria, wherein when image features are applied to the pre-specified matching criteria the pre-selected matching criteria is configured to identify a calculated match sample image from a plurality of calculated match sample images wherein the machine-learning model includes an empirical learning model, wherein the empirical learning model improves predictive performance of matching color and appearance based upon experience and supervised or unsupervised training;
apply the target image features comprising representations based on image entropy analysis of multiple subportions within the target image data to the pre-specified matching criteria of the machine-learning model; and
identify a specific calculated match sample image based upon the applied target image features substantially satisfying one or more pre-specified matching criterion of the pre-specified matching criteria;
wherein the specific calculated match sample image is utilized for matching color and appearance of the target coating.

2. The system of claim 1, wherein the system further comprises an image database, the image database includes the plurality of sample images, and the one or more data processors are configured to execute the instructions to extract sample image features from the plurality of sample images utilizing one or more feature extraction algorithms.

3. The system of claim 2, wherein the one or more data processors are configured to execute the instructions to generate the pre-specified matching criteria based on the sample image features.

4. The system of claim 3, wherein the one or more data processors are configured to execute the instructions to train the machine-learning model based on the plurality of sample images by generating the pre-specified matching criteria based on the sample image features.

5. The system of claim 1, wherein the target image data defines RGB values representative of the target coating, and wherein the one or more data processors are configured to execute the instructions to transform the RGB values to L*a*b* values representative of the target coating.

6. The system of claim 5, wherein the one or more feature extraction algorithms are configured to identify the representation based on image entropy for extracting the target image features from the L*a*b* values of the target image data, and wherein identifying the representation based on image entropy comprises dividing the L*a*b* values of the target image data into a plurality of cubic subspaces, and determining the L*a*b* values for a center of a most populated cubic subspace.

7. The system of claim 1, wherein the target image features comprise representations based on image entropy, and wherein the one or more feature extraction algorithms are configured to identify the representation based on image entropy for extracting the target image features, and wherein identifying the representation based on image entropy comprises dividing the target image data into a plurality of cubic subspaces and determining color image entropy curves for the target image data.

8. The system according to claim 1, wherein the target image features comprise representations, wherein the one or more feature extraction algorithms are configured to identify the representations based on image entropy for extracting the target image features, and wherein identifying the representations based on image entropy comprises determining one or more color image entropy curves such that the target image data is represented in a three-dimensional L*a*b* space with the one or more color entropy curves based on Shannon entropy, and wherein the one or more color entropy curves are selected from each of an a*b* plane, each of an L*a* plane, each of an L*b* plane, or one or more combinations thereof.

9. The system of claim 1, wherein the electronic imaging device further comprises a display and is further configured to cause the calculated match sample image to be displayed on the display for user review.

10. The system of claim 9, further configured to cause an image of the target coating to be displayed on the display adjacent the calculated match sample image.

11. The system of claim 8, wherein determining the color entropy curves comprises dividing the three-dimensional L*a*b* space of the target image data into a plurality of cubic subspaces, tabulating the cubic subspaces having similar characteristics to arrive at a total cubic space count for each characteristic, generating empty image entropy arrays for each of the dimensions of the three-dimensional L*a*b* space, and populating the empty image entropy arrays with the total cubic space counts corresponding to each of the dimensions.

12. The system of claim 7, wherein the representations based on image entropy are representations based on Shannon entropy.

13. The system of claim 10, further configured to:
cause one or more alternate match sample images related to the calculated match sample image to be displayed on the display along with the calculated match sample image and the image of the target coating; and
receive user selection of a visual match sample image from the calculated match sample image and the one or more alternate match sample images based on an observed similarity to the image of the target coating.

14. The system of claim 1, wherein the machine-learning model comprises a random decision forest algorithm including the plurality of pre-specified matching criteria.

15. A method for matching color and appearance of a target coating, the method comprising:
receiving, by one or more data processors, target image data of the target coating, the target image data generated by an electronic imaging device and including target image features;
retrieving, by one or more processors, one or more feature extraction algorithms that extracts the target image features from the target image data;
applying the target image data to the one or more feature extraction algorithms;
extracting the target image features comprising representations based on image entropy analysis of multiple subportions within the target image data from the target image data utilizing the one or more feature extraction algorithms;
retrieving, by one or more data processors, a machine-learning model that is trained based on sample image features extracted from a plurality of sample images to provide pre-specified matching criteria, wherein when image features are applied to the pre-specified matching criteria the pre-selected matching criteria is configured to identify a calculated match sample image from a plurality of calculated match sample images, wherein the machine-learning model includes an empirical learning model, wherein the empirical learning model improves predictive performance of matching color and appearance based upon experience and supervised or unsupervised training;
applying the target image features comprising representations based on image entropy analysis of multiple subportions within the target image data to the pre-specified matching criteria of the machine-learning model; and
identifying a specific calculated match sample image based upon the applied target image features substantially satisfying one or more pre-specified matching criterion of the pre-specified matching criteria;
wherein the specific calculated match sample image is utilized for matching color and appearance of the target coating.

16. The method of claim 15 further comprising generating the machine-learning model based on the plurality of sample images, the generating the machine-learning model including:
retrieving the plurality of sample images from an image database;
extracting sample image features from the plurality of sample images utilizing one or more feature extraction algorithms; and
generating the pre-specified matching criteria based on the sample image features.

17. The method of claim 15, wherein the electronic imaging device includes a display and wherein the method further comprises:
displaying, on the display:
the calculated match sample image,
one or more alternate match sample images related to the calculated match sample image, and
an image of the target coating adjacent the calculated match sample image and the one or more alternate match sample images; and
receiving user selection of a visual match sample image from the calculated match sample image and the one or more alternate match sample images based on an observed similarity to the target image data.

18. The method of claim 17, wherein the calculated match sample image corresponds to a primary coating formula and the one or more alternate match sample images correspond to alternate coating formulas related to the primary coating formula.

19. The method of claim 15 wherein the machine-learning model comprises a random decision forest algorithm including the plurality of pre-specified matching criteria.

20. The method of claim 15 wherein the one or more feature extraction algorithms are configured to identify representations based on image entropy for extracting the target image features, and wherein identifying the representations based on image entropy comprises determining one or more color image entropy curves such that the target image data is represented in a three-dimensional L*a*b* space with the one or more color entropy curves based on Shannon entropy, and wherein the one or more color entropy curves are selected from each of an a*b* plane, each of an L*a* plane, each of an L*b* plane, or one or more combinations thereof.

\* \* \* \* \*